(12) United States Patent
Schmedes et al.

(10) Patent No.: US 11,181,653 B2
(45) Date of Patent: Nov. 23, 2021

(54) RESERVOIR CHARACTERIZATION UTILIZING RESAMPLED SEISMIC DATA

(71) Applicant: ExxonMobil Upstream Research Company, Spring, TX (US)

(72) Inventors: Jan Schmedes, Spring, TX (US); Di Yang, Spring, TX (US); Ratnanabha Sain, Houston, TX (US); David D. McAdow, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 162 days.

(21) Appl. No.: 16/554,254

(22) Filed: Aug. 28, 2019

(65) Prior Publication Data

US 2020/0088896 A1 Mar. 19, 2020

Related U.S. Application Data

(60) Provisional application No. 62/731,182, filed on Sep. 14, 2018.

(51) Int. Cl.
*G01V 1/28* (2006.01)
*G01V 1/30* (2006.01)

(52) U.S. Cl.
CPC .............. *G01V 1/282* (2013.01); *G01V 1/301* (2013.01); *G01V 2210/612* (2013.01); *G01V 2210/6161* (2013.01)

(58) Field of Classification Search
CPC .................. G01V 1/282; G01V 1/301; G01V 2210/6161; G01V 2210/612;

(Continued)

(56) References Cited

U.S. PATENT DOCUMENTS 8,843,353 B2 9/2014 Posamentier et al.
8,923,094 B2 12/2014 Jing et al.
(Continued)

FOREIGN PATENT DOCUMENTS

CN 107783183 A 3/2018

OTHER PUBLICATIONS

Jeong et al., A Fast Approximation for Seismic Inverse Modeling: Adaptive Spatial Resampling (Year: 2017).*

(Continued)

*Primary Examiner* — Mohammad K Islam
(74) *Attorney, Agent, or Firm* — ExxonMobil Upstream Research Company, Law Department

(57) ABSTRACT

A method and apparatus for generating an image of a subsurface region including obtaining geophysical data/properties for the subsurface region; resampling the geophysical data/properties to generate a resampled data set; iteratively (a) inverting the resampled data set with an initial prior model to generate a new model; and (b) updating the new model based on learned information to generate an updated prior model; substituting the initial prior model in each iteration with the updated prior model from an immediately-preceding iteration; and determining an end point for the iteration. A final updated model may thereby be obtained, which may be used in managing hydrocarbons. Inversion may be based upon linear physics for the first one or more iterations, while subsequent iterations may be based upon non-linear physics.

24 Claims, 8 Drawing Sheets

(58) Field of Classification Search
CPC ..... G01V 2210/6244; G01V 2210/622; G01V 2210/6163; G01V 2210/6169; G01V 1/306; G01V 11/00

See application file for complete search history.

(56) References Cited

U.S. PATENT DOCUMENTS

| | | | | |
|---|---|---|---|---|
| 10,670,750 | B2* | 6/2020 | Vdovina | G01V 1/282 |
| 2011/0295510 | A1* | 12/2011 | Gulati | G01V 1/288 |
| | | | | 702/16 |
| 2015/0301223 | A1* | 10/2015 | Xu | G01V 1/50 |
| | | | | 703/2 |
| 2015/0355356 | A1* | 12/2015 | Anderson | G01V 1/28 |
| | | | | 702/14 |
| 2016/0238729 | A1* | 8/2016 | Warner | G01V 1/364 |
| 2018/0017691 | A1* | 1/2018 | Dirksen | E21B 7/04 |
| 2018/0120464 | A1* | 5/2018 | Sun | G01V 1/48 |
| 2018/0156932 | A1 | 6/2018 | Sain | |
| 2019/0064389 | A1 | 2/2019 | Denli et al. | |
| 2019/0187312 | A1* | 6/2019 | Ramox-Martinez | G01V 1/201 |
| 2019/0331812 | A1* | 10/2019 | Liu | G06T 17/05 |
| 2021/0097381 | A1* | 4/2021 | Daykin | G06N 3/08 |

OTHER PUBLICATIONS

Jeong, Quantitative Reservoir Characterization Integrating Seismic Data and Geological Scenario Uncertainty (Year: 2014).*

Aleardi et al. (2018) "Two-stage and single stage seismic petrophysical inversion applied in the Nile Delta," The Leading Edge (Jul. 2018), pp. 510-518.

Zhang et al. (2018) "Multiparameter elastic full waveform inversion with facies-based constraints," Geophysical Journal International, vol. 213, pp. 2112-2127.

Gao et al. (2012) "Joint petrophysical inversion of electromagnetic and full-waveform seismic data," Geophysics, vol. 77, Issue 3, pp. WA3-WA18.

Powers, D.M.W. (2011) "Evaluation: From Precision, Recall and F-Measure to ROC, Informedness, Markedness & Correlation", Journal of Machine Learning Technologies, ISSN: 2229-3981 & ISSN: 2229-399X, vol. 2, Issue 1, pp. 37-63.

Laloy et al. (2018) "Training-Image Based Geostatistical Inversion Using a Spatial Generative Adversarial Neural Network", AGU Publications, Water Resources Research (Jan. 8, 2018), pp. 381-406.

C. Jeong, et al. (Jul. 2017), "A Fast Approximation for Seismic Inverse Modeling: Adaptive Spatial Resampling", Mathematical Geosciences, vol. 49, No. 7, Jul. 7, 2017 (Jul. 7, 2017), pp. 845-869 XP055646676.

Atul Kumar, et al. (Feb. 2016), "A model-based approach for integration analysis of well log and seismic data for reservoir characterization", Geosciences Journal, The Geological Society of Korea, Heidelberg, vol. 20, No. 3, Feb. 8, 2016 (Feb. 8, 2016), pp. 331-350 XP035719487.

* cited by examiner

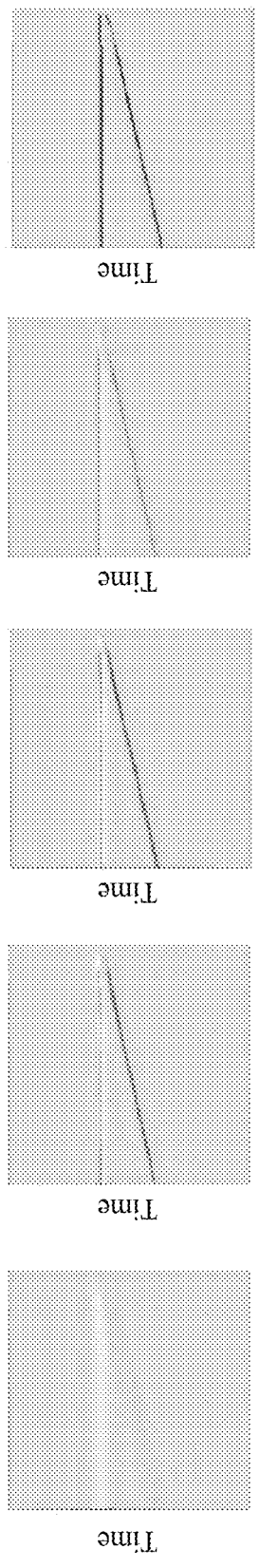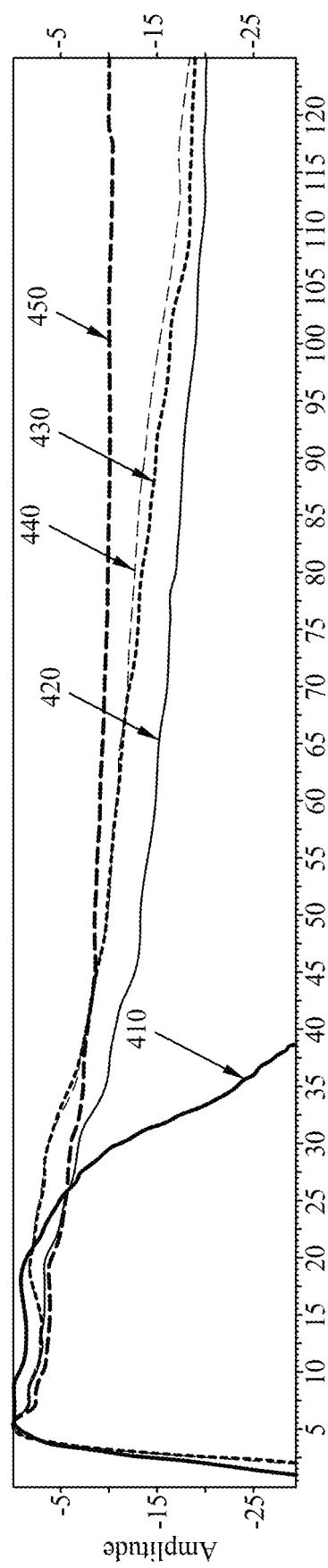
FIG. 4A  FIG. 4B  FIG. 4C  FIG. 4D  FIG. 4E
FIG. 4F

RESERVOIR CHARACTERIZATION UTILIZING RESAMPLED SEISMIC DATA

CROSS REFERENCE TO RELATED APPLICATION

This application claims the priority benefit of U.S. Provisional Application No. 62/731,182, filed Sep. 14, 2018, the disclosure of which is incorporated herein by reference in its entirety.

FIELD

This disclosure relates generally to the field of geophysical prospecting and, more particularly, to hydrocarbon management and related data processing. Specifically, exemplary embodiments relate to methods and apparatus for reservoir characterization with improved computational efficiency and accuracy by using prior-based inversion of resampled seismic data.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

An important goal of geophysical prospecting is to accurately image subsurface structures to assist in the identification and/or characterization of hydrocarbon-bearing formations. Geophysical prospecting may employ a variety of data-acquisition techniques, including seismic prospecting, electromagnetic prospecting, well logging, etc. Such data may be processed, analyzed, and/or examined with a goal of identifying geological structures that may contain hydrocarbons.

An important type of geophysical data analysis is petrophysical inversion. Petrophysical inversion generally transforms elastic parameters, such as seismic velocity and density, to petrophysical properties, such as porosity and volume of clay ($V_{clay}$). For example, petrophysical inversion can transform compressional velocity, shear velocity, and density well logs to porosity and $V_{clay}$ logs. As another example, petrophysical inversion can utilize elastic information from seismic data, including traditional images of reflectivity and tomographic velocity, to predict three-dimensional volumes of porosity and $V_{clay}$. As used herein, $V_{clay}$ refers to rock volumes including anything that is not sand (e.g., shale). That is, we will treat clay and shale (and associated properties such as $V_{clay}$ and $V_{shale}$) interchangeably with the recognition that they are not strictly the same from a mineralogical standpoint. For the present application's purposes, however, it is suitable to treat them interchangeably as one of the volumetric mineral end-members of subsurface rocks, the other one being sand. Furthermore, petrophysical inversion can include additional geophysical data types, namely electromagnetic data or resistivity, which tend to have a better sensitivity to water saturation than elastic parameters.

Depending on the reservoir, petrophysical inversion may be useful to infer petrophysical properties other than porosity and $V_{clay}$. A rock physics model that relates other petrophysical properties to elastic parameters (e.g., from seismic data) may be utilized to do so.

Broadly, two categories of relationships are used to relate petrophysical properties to seismic data. The first relationship type is referred to as a rock physics model ("RPM"). RPMs relate petrophysical rock properties, such as porosity and $V_{clay}$ (or, equivalently as noted above, $V_{shale}$), and fluid (hydrocarbon or water) content to geophysical rock properties, such as compressional (P-wave) and shear (S-wave) velocities, and density. Geophysical rock properties depend on elastic rock properties, such as bulk and shear moduli. RPMs can be either inductive (empirical) or deductive (theoretical). RPMs can be mathematically linear or nonlinear. RPMs may be calibrated using direct well-bore measurements and collocated seismic data. The second relationship type is referred to as an angle-dependent amplitude model ("ADAM"). ADAMs relate amplitudes of reflected seismic waves that have traveled through the subsurface to changes in the geophysical properties of the rocks between one layer and the next, as well as the angle of incidence with which the wave impinged on the boundary. Consequently, changes in amplitude as a function of receiver offset ("amplitude-variation with offset," or "AVO"), and/or changes in amplitude as a function of receiver angle ("amplitude-variation with angle," or "AVA"), can be used to infer information about these elastic parameters. To take advantage of AVO and/or AVA, subsets of seismic reflection data corresponding to particular offsets (or angles) or small groups of offsets (or angles) can be processed into what are called angle stacks. ADAMs can be linear or nonlinear in mathematical representations.

Conventional approaches to generate petrophysical properties from seismic angle stacks involve a two-step (e.g., sequential or cascaded) inversion process. Typically, the first step is seismic inversion, sometimes also referred to as elastic geophysical inversion, whereby elastic or geophysical properties are inverted from seismic angle stacks. Typically, the second step is petrophysical inversion, whereby petrophysical properties are inverted from geophysical properties. See, e.g., U.S. Patent Publication No. 2018/0156932 at Paragraph 7, incorporated by reference herein.

Seismic data is typically sampled in a limited frequency band. Rock properties predicted from seismic and/or petrophysical inversion may maintain the bandlimited nature of the seismic data, resulting in smooth representations of sharp layer boundaries. Moreover, the same band-limit problem carries through when other data derived from seismic data (e.g., seismic angle stacks, elastic properties such as P- or S-wave velocity, and the like) is used as input to seismic and/or petrophysical inversion for determining rock properties. Attribute calibration workflows, which are often uncertain, must be used to estimate layer thickness from the smooth representations. Layer thickness is useful for reservoir assessment, geologic model building, well planning, and other aspects of hydrocarbon management, including prospecting, exploration and development. However, layer thickness and petrophysical property estimates may become inaccurate as thickness approaches the detectability limit. More efficient equipment and techniques to more precisely predict rock properties from seismic data and/or data derived therefrom would be beneficial.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIGS. 4A-4E illustrate the first derivative of the inverted porosity for the iterations shown in FIGS. 3A, 3C, 3E, 3G, and 3I. FIG. 4F shows the spectral content of the petrophysical property estimates shown in FIGS. 4A-4E.

DETAILED DESCRIPTION

Figure 1A:
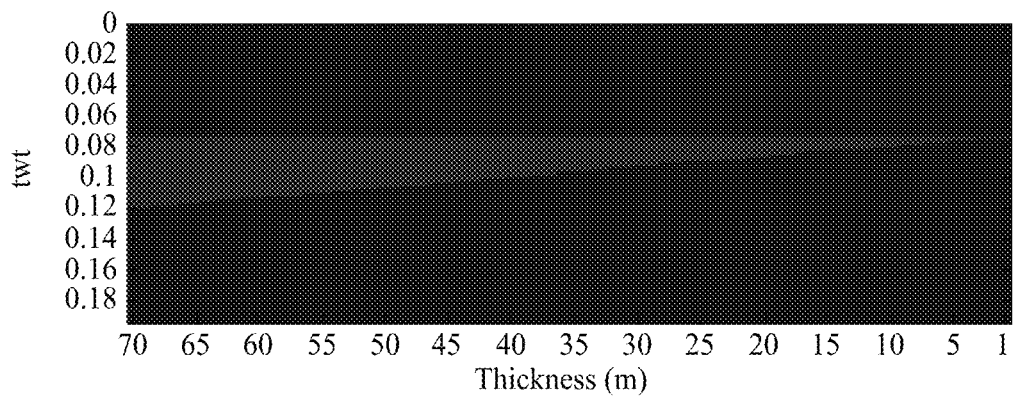
FIG. 1A illustrates a wedge model for a petrophysical property of interest.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation. The term "nominal" means as planned or designed in the absence of variables such as wind, waves, currents, or other unplanned phenomena. "Nominal" may be implied as commonly used in the fields of seismic prospecting and/or hydrocarbon management.

If there is any conflict in the usages of a word or term in this specification and one or more patent or other documents that may be incorporated herein by reference, the definitions that are consistent with this specification should be adopted for the purposes of understanding this disclosure.

As used herein, "inversion" refers to any process whereby, for a quantity y known to depend on one or more variables x (e.g., collectively forming a model m(x)), inferring the specific values of x (or the specific model m(x)) that correspond to measured values of y. For example, a model may be derived from field data to describe the subsurface that is consistent with acquired data. For example, seismic inversion may refer to calculating acoustic impedance (or velocity) from a seismic trace, taken as representing the earth's reflectivity. Inverse problems contain three key elements: data, model parameters, and model structure. In the realm of petrophysical inversion, the data element is generally geophysical data such as seismic angle stacks, seismic velocities, resistivity, density, etc. In the realm of petrophysical inversion, the model parameters element is generally petrophysical properties such as porosity, $V_{clay}$, $V_{shale}$, water saturation, lithology, etc. In the realm of petrophysical inversion, the model structure element is generally forward physics or statistical model relating data and model parameters; structure of petrophysical constraints; a priori concepts of porosity and $V_{clay}$ distributions, etc.

As would be understood by one of ordinary skill in the art with the benefit of this disclosure, a variety of petrophysical inversion techniques may be applicable herein. Exemplary petrophysical inversion techniques include i) two-stage petrophysical inversion (Aleardi, Mattia, Ciabarri, Fabio, Calabro, Roberto, 2018, "Two-stage and single stage seismic petrophysical inversion applied in the Nile Delta," The Leading Edge, Vol. 37, Issue 7 (July 2018), 510-518), ii) one-stage petrophysical inversion (Aleardi, 2018; US20180156932A1), iii) petrophysically-constrained Full Wavefield Inversion ("FWI") (Zhang, Zhen-dong, Alkhalifah, Tariq, Naeini, Ehsan Zabihi, Sun, Bingbing, 2018, "Multiparameter elastic full waveform inversion with facies-based constraints," Geophysical Journal International, Vol. 213, Issue 3, pp. 2112-2127), and iv) joint inversion (Gao, Guozhong, Abubakar, Aria, Habashy, Tarek M, 2012, "Joint petrophysical inversion of electromagnetic and full-waveform seismic data," Geophysics, Vol. 77, Issue 3, pp. WA3-WA18). For example, joint inversion may include any of the other petrophysical inversion techniques wherein seismic data is used jointly with other geophysical data, such as gravity, magnetics, and/or electromagnetic geophysical data. Typically, a two-stage petrophysical inversion solves for geophysical properties (such as elastic parameters or resistivity) in a first stage, and then a second stage transforms from geophysical properties to petrophysical properties. A one-stage petrophysical inversion solves directly for petrophysical properties from geophysical data. While petrophysical inversion is historically thought of as a post-stack reservoir characterization method, recent advances in FWI also provide techniques applicable to the current disclosure. For example, in a variant of the two-stage inversion approach, FWI may produce the elastic parameters (for example, p-wave velocity $V_p$, the ratio of p-wave velocity to s-wave velocity $V_p/V_s$, and/or p-wave impedance $I_p$, and density). As another example, petrophysically-constrained FWI may be analogous to a one-stage petrophysical inversion, but the forward modeling engine is FWI, and application of petrophysical constraints is performed inside the FWI iteration loop. Petrophysical inversion techniques are applicable to solve a variety of technical problems. Petrophysical inversion techniques may utilize a broad range of computational complexity and/or a multi-dimensional fluid saturation model.

As used herein, "offset" refers to a distance between a source and a receiver.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

The term "seismic data" as used herein broadly means any data received and/or recorded as part of the seismic surveying process, including reflection, shear, and/or refraction wave data; but "seismic data" also is intended to include any data or properties, including geophysical properties such as one or more of: elastic properties (e.g., P and/or S wave velocity, P-Impedance, S-Impedance, density, and the like); seismic stacks (e.g., seismic angle stacks); compressional velocity models; or the like, that the ordinarily skilled artisan at the time of this disclosure will recognize may be inferred or otherwise derived from such data received and/or recorded as part of the seismic surveying process. This is in recognition of the problem described above, that band limitations in seismic data carry through to data derived therefrom. Accordingly, any use of such seismic data or data derived therefrom may benefit from the presently disclosed techniques. Thus, we may at times refer to "seismic data and/or data derived therefrom," or equivalently simply to "seismic data." Both terms are intended to include both measured/recorded seismic data and such derived data, unless the context clearly indicates that only one or the other is intended.

The terms "velocity model," "density model," "physical property model," or similar terms, as used herein refer to an array of numbers, typically a 3-D array, where each number, which may be called a model parameter, is a value of velocity, density, or another physical property in a cell, where a subsurface region has been conceptually divided into discrete cells for computational purposes. Typically, the spatial distribution of velocity will be modeled using constant-velocity units (layers) through which raypaths obeying Snell's law can be traced.

As used herein, "hydrocarbon management" or "managing hydrocarbons" includes any one or more of the following: hydrocarbon extraction; hydrocarbon production, (e.g., drilling a well and prospecting for, and/or producing, hydrocarbons using the well; and/or, causing a well to be drilled to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.).

Embodiments disclosed herein may advantageously generate petrophysical properties directly from seismic data in a one-step inversion approach (in contrast to conventional two-step inversions). For example, seismic data and/or data derived therefrom, such as a 3D model of compressional velocity, may be inverted jointly for petrophysical properties. An iterative approach may be utilized, alternating between an optimization step and a learning step. The cost function U(m) (sometimes equivalently referred to as an objective function) in the optimization step can be written as:

$$U(m) = (G[m]-d)C_D^{-1}(G[m]-d) + (m-m_{prior})C_M^{-1}(m-m_{prior}) \quad (1)$$

where the prior model $m_{prior}$ is some model using prior knowledge. G is a mathematical transformation usually called forward model, which uses petrophysical properties m as input, and which outputs seismic data and geophysical properties. G is usually nonlinear, but G may be linear. The observed seismic data (e.g., seismic stacks and a compressional velocity model) are denoted by d. The matrices $C_D$ and $C_M$ are the covariance matrices for the data and the model term, respectively. The matrices $C_D$ and $C_M$ essentially provide the weighting of the contributions of various data, as well as the relative weighing of the model term. The optimization step seeks to minimize the cost function U(m). During the learning step, the prior model $m_{prior}$ is updated based on learned information. For example, the learned information may be related to the subsurface region, similar subsurface regions, or subsurface regions in general. The updating may, for example, provide better representation of high frequency information, thereby improving the resolution of the model.

In some embodiments, additional regularization (e.g., model smoothing) may be added to the cost function. Regularization is typically utilized with nonlinear inversion problems. For example a simple form of model smoothing in a 1D inversion of one trace location may minimize the square of the first vertical derivative of the inverted model. A weight may be added to control how much the model should be smoothed. A larger weight may indicate a smaller change in the model in the vertical direction. In some embodiments, reservoirs without sharp boundaries may complicate resolution of layer thickness with smooth petrophysical properties estimates.

Regularization may also be used to add resolution when high frequency input data are missing. For example, a variant of an L1 norm-based model regularization may be used in order to retain strong contrasts. In this variant for a 1D inversion, the absolute value of the vertical derivative is minimized. By minimizing the absolute value, single jumps are permitted, leading typically to blocky models with sharp contrasts. However, resolution added by this type of regularization may still lack precision regarding layer thickness, because the inversion is typically executed at the sampling rate of the seismic data.

Conventionally, the prior model is typically manually constructed using well logs and/or interpretation of seismic layer boundaries. Embodiments disclosed herein may advantageously generate a prior model from the current estimate of petrophysical properties obtained from the immediately preceding optimization step (or some initial model if no iteration has been performed yet). For example, a learning step may be used to automatically infer a prior model. Various machine learning approaches may be utilized to infer the prior model, ranging from simple 1D Hidden Markov Models to deep learning approaches (e.g., utilization of neural networks such as convolutional neural networks, or CNNs) incorporating 3D concepts and knowledge of the rocks. The choice of the approach depends among other things on the information available to train the learning system.

For example, if only well logs are available for training, a simple 1D Hidden Markov Model may suffice to predict 1D prior models for each seismic trace. In this method of training a learned information subsystem, the training information may include probability distributions for the petrophysical properties of different rock types (e.g., shale and sandstone) as well as a description of the probability to transition from one rock type to another (e.g., having a shale followed by a sand or vice versa). More sophisticated deep learning methods may also be trained if only well logs are available.

As another example of training a learned information subsystem, if the training information includes 3D models incorporating spatial pattern and/or relations of rock types based on geological field analogues, geologic concepts, or physics-based simulations, a more complex 3D learning system can be trained to predict 3D prior models for an extended seismic volume or smaller sub-volumes. Typically such learned information subsystems would be neural networks (e.g., CNNs), but other systems and methods may be suitable.

In some embodiments, the learned information subsystem may be trained using well logs, synthetic traces, 3D concepts model, 3D physical simulations, and/or 3D analogues. For example, the learned information subsystem may be any type of neural network trained using well logs and/or synthetic traces, any type of machine learning algorithm which returns probabilities of rock types that can be trained using well logs and/or synthetic traces, or any type of machine learning algorithm which returns probabilities of rock type that can be trained using 3D concepts model and/or 3D physical simulations and/or 3D analogues.

As would be understood by a person of ordinary skill in the art with the benefit of this disclosure, seismic surveys sample in a limited frequency band that is selected to match the subsurface region characteristics and the depth of interest. Sampling refers to detecting, acquiring, measuring, and/or capturing discrete data points from a continuous analog signal in order to record digital data. Under-sampling a signal may lead to aliasing of the data. In order to avoid aliasing, each constituent frequency is typically sampled more than two times per signal wavelength. The "Nyquist frequency" is half of the sampling frequency of a digital recording system. For example, a recording system with a 250 Hz sample rate has a Nyquist frequency of 125 Hz. The Nyquist frequency should be higher than all of the frequencies of interest in the observed signal to allow precise reconstruction of the signal from the samples. Seismic data is usually acquired with either a 4 millisecond sample interval (250 Hz sample rate) if offshore, or 2 millisecond sample interval (500 Hz) on land. Seismic or petrophysical inversion typically provides property estimates in the seismic frequency band, or more broadly, in the frequency band of the geophysical data used as input. Rock properties predicted from inversion may maintain the bandlimited nature of the input data. The resolution of the inverted model is driven by the resolution of the input data. However, seismic input data is often missing high frequency bands. For example, mechanical loss and wavefield scattering tend to attenuate seismic waves at higher frequencies, thus limiting what can be recovered using the seismic data alone.

Figure 1B:
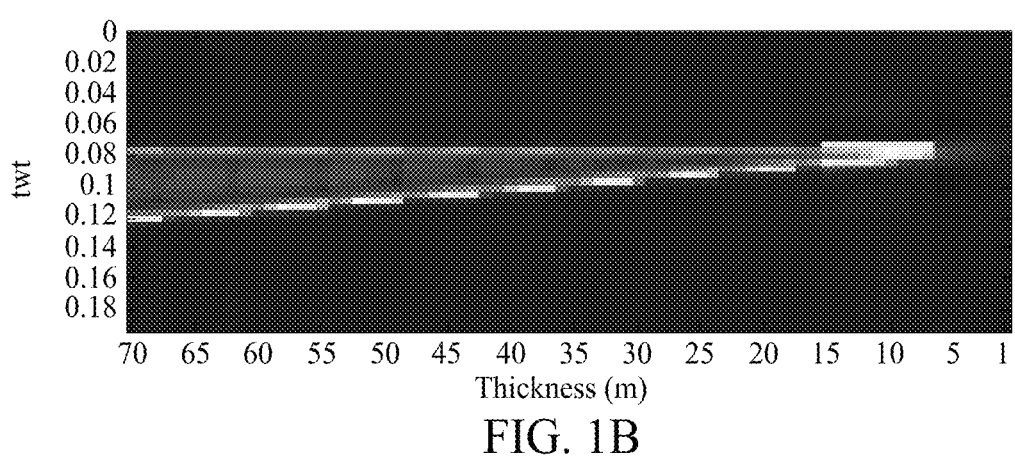
FIG. 1B illustrates the results of an inversion of the wedge model of FIG. 1A.

FIGS. 1A-1B illustrate the results of petrophysical inversion at a typical seismic frequency band, for example about 4 Hz to about 50 Hz, with y-axis values indicating twt (two-way travel time, in seconds) of seismic waves to travel from source to a given reflector, and x-axis values giving modeled sand wedge thickness in m. Note that typical seismic frequency bands lack higher frequencies, in this example frequencies larger than ~50 Hz. The input data are seismic angle stacks as well as a velocity model. FIG. 1A illustrates a simple wedge model for a petrophysical property of interest (e.g., porosity or $V_{clay}$). Synthetic seismic data and a compressional velocity were computed based on this model and then jointly inverted at a typical seismic sampling rate (e.g., about 4 milliseconds, or about 2 milliseconds for high resolution seismic data). FIG. 1B illustrates the results of the inversion. As can be seen in FIG. 1B, the petrophysical property of interest (e.g., porosity or $V_{clay}$) is not recovered correctly in amplitude. Further, the thickness of the "wedge" is not precisely recovered due to the coarse sampling of the seismic data. Although a variety of algorithms are known for estimating layer thickness from an inversion result as in FIG. 1B, none provide certainty. Several different models with sub-seismic resolution can have the same low frequency components as the inversion result while having different net sand thickness. Note that the absence of higher frequencies in the sampled data may cause very thin sands to be essentially unrecoverable. Although the seismic input data may indicate a small signal for a very thin sand layer, the same lack of precision as illustrated in FIG. 1B may cause the thin sand layer to be unresolved in the inversion.

Figure 1C:
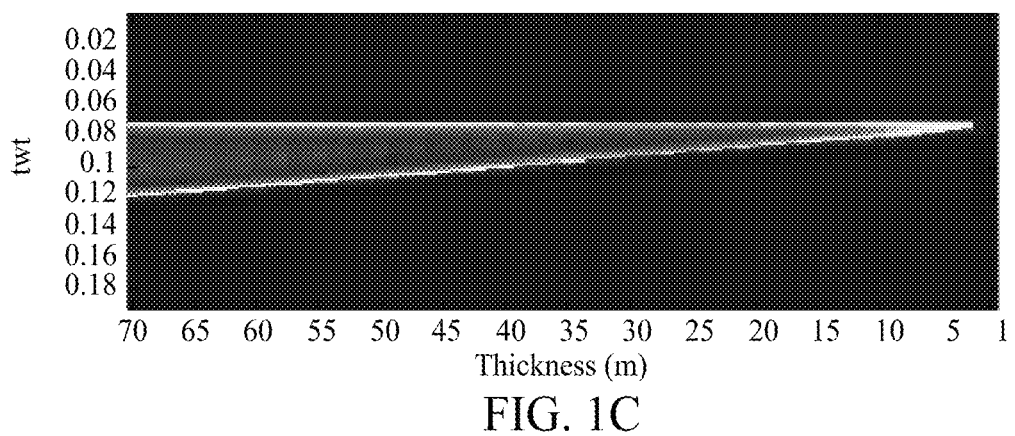
FIG. 1C illustrates the results of an inversion of resampled synthetic seismic data based on FIG. 1A.

FIG. 1C illustrates results from an inversion of resampled synthetic seismic data based on FIG. 1A. In preparation for this inversion, the synthetic seismic data has been resampled by a factor of four, and the inversion has been performed at the finer sampling rate. FIG. 1C illustrates better thickness and property amplitude estimates in comparison to FIG. 1B (sampled at typical seismic sampling rate). In addition, the resolution limit of FIG. 1C is pushed to thinner sands compared to the seismic scale inversion of FIG. 1B.

Figure 1D:
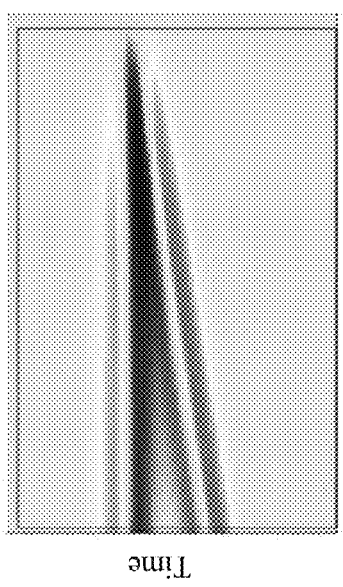
FIG. 1D illustrates a 2D window of the seismic angle stack (based on FIG. 1A) at near angles.
Figure 1E:
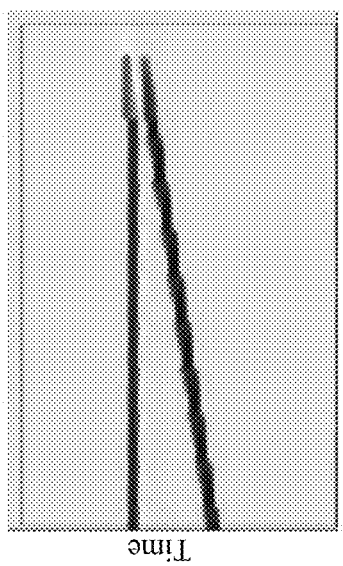
FIG. 1E illustrates the derivative of the model shown in FIG. 1B.
Figure 1F:
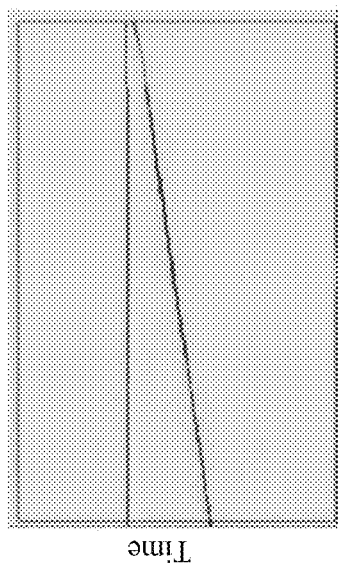
FIG. 1F illustrates the derivative of the model shown in FIG. 1C.
Figure 1G:
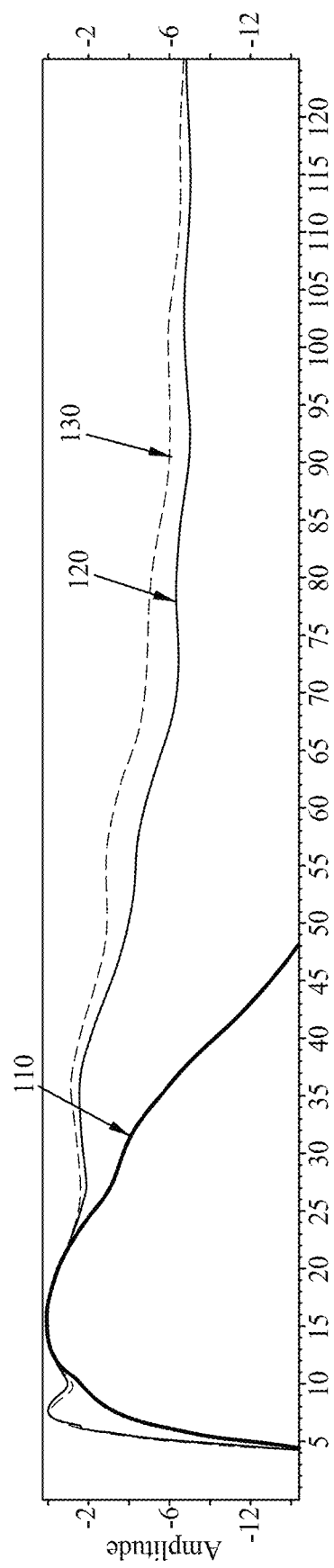
FIG. 1G illustrates the amplitude spectra computed for each of FIGS. 1D, 1E, and 1F.

FIGS. 1D-1G further analyze the data from FIGS. 1A-1C. FIG. 1D illustrates a 2D window of the seismic angle stack at near angles. FIG. 1E illustrates the derivative of the model shown in FIG. 1B (sampled at typical seismic sampling rate). FIG. 1F illustrates the derivative of the model shown in FIG. 1C (resampled data). Note that the derivative at the boundary of the wedge is fuzzy in FIG. 1E. In contrast, the boundary is sharp in FIG. 1F (corresponding to the resampled seismic data). The analysis is further illustrated in FIG. 1G, which shows the amplitude spectra computed for each of FIGS. 1D (spectrum 110), 1E (spectrum 120), and 1F (spectrum 130). The spectrum 130, corresponding to the inversion of the resampled data (FIG. 1F), is almost flat and extends out to frequencies much higher than in the input data (spectrum 110). Compared to the spectrum 120, corresponding to the inversion at a typical seismic sampling rate (FIG. 1E), the spectrum 130 also contains more energy at high frequencies.

The constructed prior model may provide additional information to the inversion process in the high frequency range, which is typically absent in observed seismic data. The higher frequencies (e.g., about 50 Hz to about 150 Hz) may be referred to as sub-seismic frequencies, because they pertain to resolution scales smaller than what is detectable by seismic data alone. One advantage of this approach is that the high frequency information missing from (or underrepresented in) the seismic angle stacks may be constructed automatically using resampling with a prior model based on learned information. Construction of the high frequency information may occur in the learning step without manual intervention or manually intensive processes, such as building a high frequency model using well logs and/or interpretation of seismic layer boundaries.

It should be appreciated that there may be trade-offs in computational expense when iteratively inverting resampled data. For example, running a single inversion with a data set sampled at a typical seismic sampling rate may require less computer power and time than running a single inversion with a resampled data set having a sampling rate higher than the typical seismic sampling rate. As a rough estimate, the number of data points for the resampled seismic data may be twice that of the original data set. The computer time and resources employed for the inversion step may increase geometrically with the number of data points. However, as would be understood by one of ordinary skill in the art with the benefit of this disclosure, the increase in computer time and resources employed for a single inversion may be fully compensated by increased resolution of the final result allowing for more accurate prediction of reservoir properties, such as reservoir thickness and average reservoir porosity. However, this advantage cannot be achieved by simply resampling the data and running an inversion. For example, as illustrated in FIG. 1B, the inversion was run using the resampled data and resampled geophysical properties, but the prior model was a simple half space. The result still looks similar in resolution to seismic data, and the increased resolution is not observed by resampling alone. Alternatively, FIG. 1C illustrates results achievable with embodiments disclosed herein, including iterative updates to the prior model (FIG. 1A).

Figure 2:
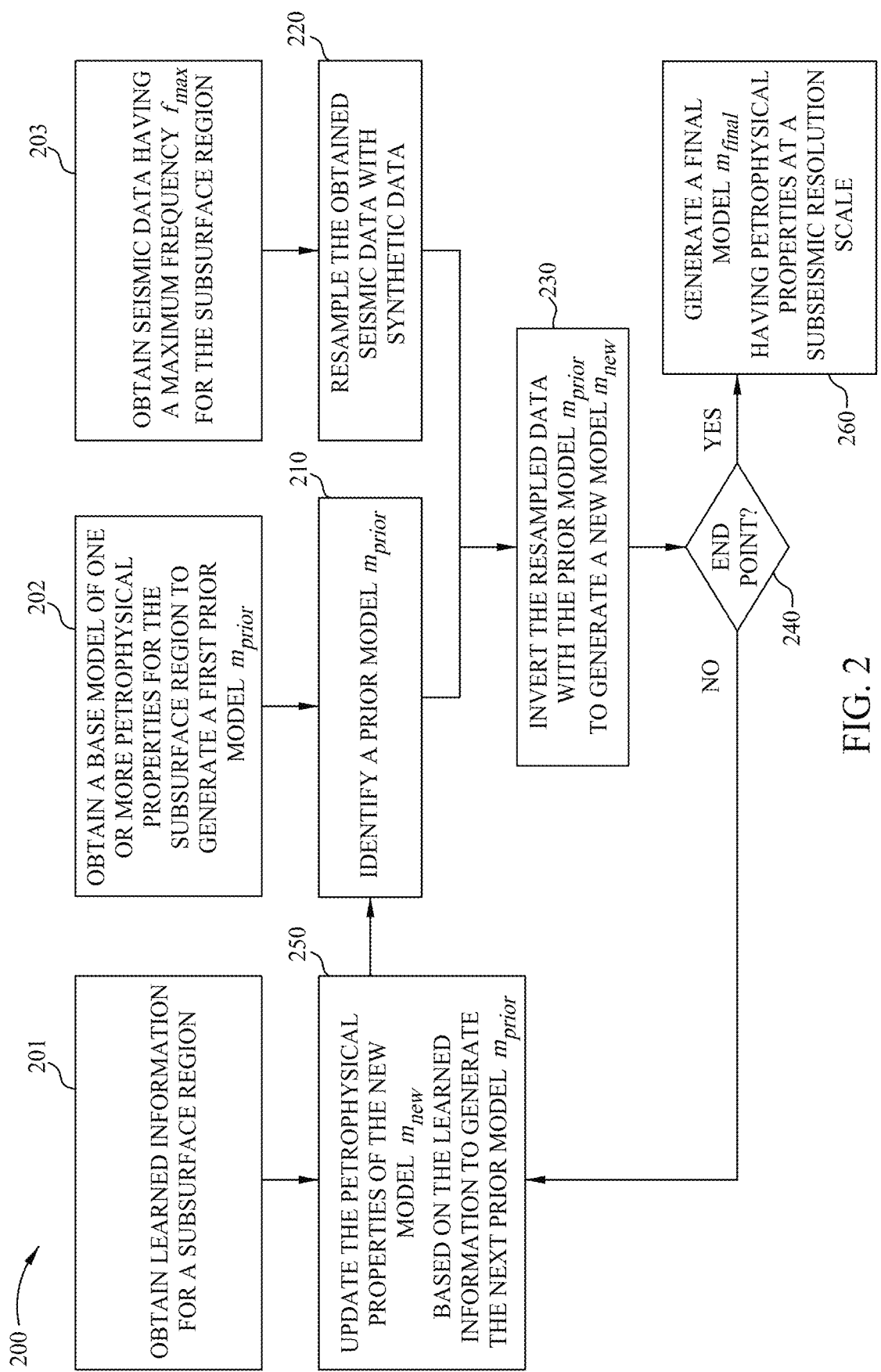
FIG. 2 illustrates an exemplary method for reservoir characterization according to embodiments disclosed herein.

FIG. 2 illustrates an exemplary method 200 for reservoir characterization. The method 200 begins with obtaining information, data, and models as initial input to the method 200. For example, at block 201, learned information about a subsurface region is obtained. The learned information may be, for example, information regarding abundance and/or spatial distribution probabilities of rock types expected to be found in the subsurface region. The learned information may include, for example, relationships between petrophysical properties and rock types. The learned information may include, for example, information regarding transition probabilities between rock types. The learned information may include spatial patterns of rock types. The learned information may be, for example, based on information previously gathered at the subsurface region, at similar subsurface regions, or at subsurface regions in general, from a variety of sources (e.g., based upon direct measurements via, for instance, core sampling; or from prior seismic analyses and subsurface interpretation techniques carried out for a given subsurface region (or for any subsurface region generally, and in particular those with similar characteristics), including via inversion and other geophysical analytical processes known to those skilled in the art; and/or any combination of such techniques and/or measurements). A variety of machine learning techniques may be utilized to collect, organize, and/or analyze the previously-gathered information in order to develop the learned information and/or to train a learned information subsystem. For example, suitable machine learning techniques may include simple 1D methods as used in speech recognition and/or deep learning neural networks trained to return 3D models based on geologic concepts. The choice of the learned information subsystem may depend, among other things, on the information available for training. A suitable learned information subsystem may be configured to output and/or update prior models containing sub-seismic information.

At block 202, the method 200 also includes obtaining a base model for one or more petrophysical properties for the subsurface region of present interest. The base model may include, for example, a measurement of porosity as a function of depth. In some embodiments, the base model may be simply a single value (e.g., for a single porosity value) throughout the subsurface region. In some embodiments, the base model may be a half space or some compaction trend or combination of several compaction trends. In some embodiments, the base model may be built upon the learned information of block 201. In some embodiments, a base model is selected that is consistent with all available data (e.g. angle stacks and $V_p$ from FWI) and already contains sub-seismic information to condition the geologic model.

An exemplary application of method 200 is illustrated in FIGS. 3A-3I (showing two-way travel-time twt in seconds versus porosity (void fraction) in inversions of a synthetic seismic data set) and 4A-4E (illustrating twt (as 'time') on the y-axis versus in-line trace number on the x-axis). In the examples discussed in FIGS. 3A-3I and 4A-4E, a linear base model for the nonlinear inversion is computed using a linear inversion. For example, the illustrations of FIGS. 3A-3F are computed using only linear inversion, while the illustrations of FIGS. 3G-3I apply nonlinear inversion. A linear inversion may use linear or log-linear physics (e.g., linear or log-linear relations between petrophysical and elastic parameters). The amplitude-versus-offset behavior of the data is estimated using a linear approximation. Linear physics is used in the forward model, which may be written in a simple matrix form. Linear inversions are typically more robust than nonlinear inversions. Linear inversion does not utilize iterations during the inversion (e.g., block 230 of FIG. 2).

Nonlinear inversion uses nonlinear physics for either the rock physics or the amplitude-versus-offset equations, or both. Nonlinear inversion linearizes around the current model and iterates to perform the optimization step. Unlike linear inversion, non-linear inversion typically utilizes iterations during the inversion (e.g., block 230 of FIG. 2). Furthermore, nonlinear inversions may show a stronger dependency on the starting model than linear inversions.

A two-step approach (i.e., build a linear base model with linear inversion (e.g., based on linear physics), and then use that linear base model with nonlinear inversion (e.g., based on nonlinear physics)) typically yields more robust results than doing a non-linear inversion starting from a simple base model (e.g., a half space). The two-step linear-non-linear approach furthermore reduces the computational costs because the optimization steps using linear physics are faster, and only few nonlinear iteration steps will typically refine the linear base model computed using linear inversion. Because the linear inversion is mostly used to build a good starting model, linear inversion can be run for a fixed number of iterations of optimization and learning. Another approach would be to iterate with the linear inversion until convergence (e.g., such that the value(s) inverted for in the updated model vary by less than 10%, such as less than 5%, or less than 2%, as compared to the values of the immediately previous model). At any rate, such methods could include multiple iterations of (a) inverting a resampled data set with an initial prior model of a subsurface region to generate a new model of the subsurface region; and (b) updating the new model based on learned information to generate an updated prior model of the subsurface region. The iteration of (a) and (b) can be carried out until an end point is determined, thereby obtaining a final updated model of the subsurface, by substituting the initial prior model in each iteration with the updated prior model from an immediately-preceding iteration. The linear-nonlinear approach would entail carrying out the first n iterations (where n may be 1, 2, 3, 4, 5, 6, 7, 8, 9, 10, . . . 1,000, . . . 10,000, . . . 100,000, . . . etc.—that is, the first one or more iterations) using linear or log-linear physics; and carrying out all subsequent iterations using nonlinear physics. Further, in some particular embodiments, any geophysical data may be used in such linear-nonlinear processes, instead of (or in addition to) the resampled data—this would include any seismic data (measured or otherwise), and/or data derived therefrom, with or without resampling. Although, it will be appreciated that particular embodiments as described herein utilize the linear-non-linear approach in combination with the resampling described elsewhere, as is the case with the trained system used in the examples discussed in connection with FIGS. 3 and 4.

Further, the trained system used in the examples discussed in FIGS. 3A-3O and 4A-4E, is a 1D Hidden Markov Model (HMM) of order 1. The information learned by the system is probability distributions of rock types as well as transitional probabilities, which describe the probability to transition from one rock type to another, as well as to transition from a rock type to itself.

Figure 3B:
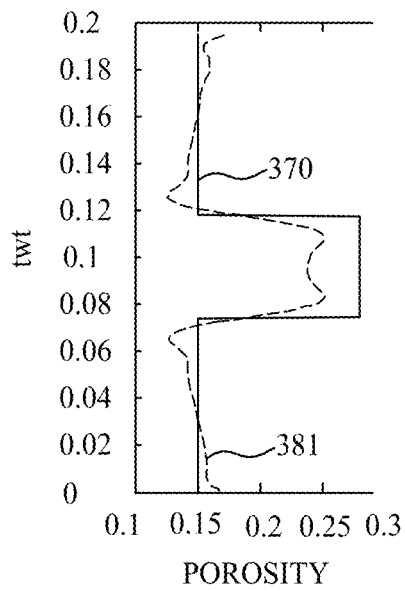
FIGS. 3A-3J illustrate how prior models and seismic data are updated during iteration cycles of the method of FIG. 2.
Figure 3D:
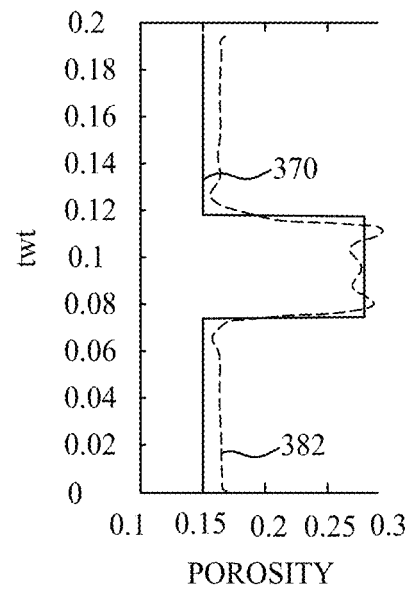
Figure 3A:
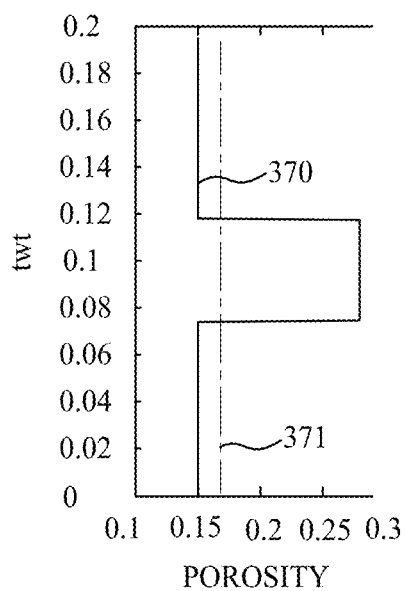

FIG. 3A illustrates a base model 371 of porosity having a single value (0.17) throughout the subsurface region. For reference, FIG. 3A also illustrates the "true" porosity model 370 utilized to generate synthetic seismic data for the purposes of this example. This true porosity model has values only for shale and for sand.

For the examples discussed in FIGS. 3A-3I and 4A-4E, the HMM was trained for the nonlinear inversion to predict only probabilities of two rock types, a shale and a sand (see Table 1 for the mean values of the two rock types). The HMM was trained for the linear inversion to predict, in addition to the shale and the sand, two lower quality sands in between the shale and the sand distributions. While these rock types do not exist in the true model, they make it easier to build the prior model if the signal in the data is small by increasing the quality of the sand at each iteration. Once the clean sand is present in the prior model, these two rock types are not necessary anymore and can be removed.

TABLE 1

| Rock Type | Mean Porosity (void fraction) | Mean Volume of Clay (vol. fraction) |
| --- | --- | --- |
| Shale | 0.15 | 0.54 |
| Sand | 0.28 | 0.13 |

At block 210, for the initial iteration, the prior model is identified as the base model of block 202.

At block 203, the method 200 also includes obtaining geophysical data and/or geophysical properties (including seismic data and/or data derived therefrom; but noting this may also include one or more additional geophysical data types such as electromagnetic data, resistivity data, etc.) detected, observed, measured, and/or acquired at the subsurface region (including, also, data and/or properties derived from seismic data). For example, different combinations of data and properties are possible, including only seismic data, data derived from seismic data, other geophysical data types, and combinations thereof. More particularly, data combinations may include: seismic data and/or a velocity model, seismic data and/or elastic parameters, seismic data and/or electromagnetic data, only elastic parameters (e.g., compressional velocity, shear wave velocity and density); or, seismic data and/or data derived therefrom, in combination with other geophysical data types, as is the case with seismic data and/or resistivity model(s), elastic parameters and resistivity model(s), etc. In some embodiments, seismic data may be used and/or inverted, for example FWI, to determine elastic parameters for the subsurface region. For ease of reference, sets of various combinations of data and properties will be referred to herein as "seismic data sets." Recognizing further, as previously noted herein, that seismic data may readily include both directly measured seismic data and data derived therefrom, such data sets may also be referred to as "sets of seismic data and/or data derived therefrom" for the sake of thoroughness, although a reference to "seismic data set" should, unless the context clearly indicates otherwise, be considered to also include a reference to a set of data derived from measured seismic data. In whatever form obtained (measured and/or calculated or computed), the geophysical data of interest may have a maximum frequency $f_{max}$. Therefore, the geophysical data may be sampled at a maximum sampling rate $SR_{max}$, where $SR_{max} \geq 2 \times f_{max}$. For the purposes of this example, we consider obtained seismic data that comes from synthetic seismic data generated as illustrated by the "true" porosity model 370 of FIGS. 3A-3I. In addition, a lower frequency velocity model was created from the "true" porosity model.

The method 200 continues at block 220, wherein the obtained seismic data of block 203 is resampled to generate resampled seismic data. Resampling synthesizes seismic data values at intermediate sampling times throughout the data set. In general, resampling may include statistical techniques such as randomization, bootstrapping, or subsampling. In some embodiments, resampling may refer to subsampling. For example, if the obtained seismic data contains values sampled at times $t_2$, $t_4$, $t_6$, and $t_8$, resampling synthesizes seismic data values at times $t_3$, $t_5$, and $t_7$, where $t_2 < t_3 < t_4 < t_5 < t_6 < t_7 < t_8$. In some embodiments, resampling essentially doubles the sampling rate SR for the obtained seismic data. (Note that the original sampling rate SR will typically be selected to ensure a Nyquist frequency larger than the highest frequency recorded in the obtained seismic data.) In some embodiments, resampling essentially quadruples the sampling rate SR for the obtained seismic data. In some embodiments, resampling synthesizes seismic data values at every-other, every-third, or other various intermediate sampling times. In some embodiments, resampling synthesizes multiple seismic data values intermediate to pairs of sequential seismic data. Resampling synthesizes seismic data by interpolating based on the existing seismic data. For example, the value for a synthesized seismic data point may simply be an average of the immediately-preceding seismic data value and the immediately-following seismic data value. As another example, oscillatory seismic data may be interpolated using sinc functions. A variety of interpolation techniques may be utilized to resample the obtained seismic data. Appropriate resampling and/or interpolation techniques may be chosen to ensure high fidelity to the obtained seismic data. As used herein, "high fidelity" implies that no artificial high frequency information is added, and that information from the original data set is not altered or lost. Absent high fidelity resampling and/or interpolation, there is a risk that spurious ripples or other noise may be introduced into the data, which may propagate or inflate during the inversion. In some embodiments geophysical properties may be resampled. If the geophysical properties are absolute band in terms of frequency (e.g., about 0-15 Hz for a velocity model derived via FWI), a simple linear interpolation may be appropriate.

The method 200 continues at block 230, wherein the resampled data is inverted (e.g., petrophysical inversion) with the prior model of block 210 to generate a new model. This inversion may be referred to as the optimization step. Being based on the resampled data of block 220, the new model includes sub-seismic information from the prior model. FIG. 3B illustrates new model 381 resulting from an inversion of the synthesized seismic data and the base porosity model 371. This first optimization step may be performed using linear physics, as discussed above. Note that in FIG. 3B, side lobes are visible at the edge of the sand, indicating that the porosity decreases before it increases.

The method 200 continues at block 240, wherein a determination is made whether the iteration cycle has reached an end point. In some embodiments, the method 200 is configured to iterate a fixed number (e.g., four or five) of cycles before reaching an end point. In some embodiments, the method 200 reaches an end point when the prior model stabilizes (e.g., the prior model of the $n^{th}$ iteration deviates less than about 10% from the prior model of the n+1 iteration). For example, prior model 375 in FIG. 3I can be seen to be substantially equal to the prior model 374 in FIG. 3G.

Figure 3C:
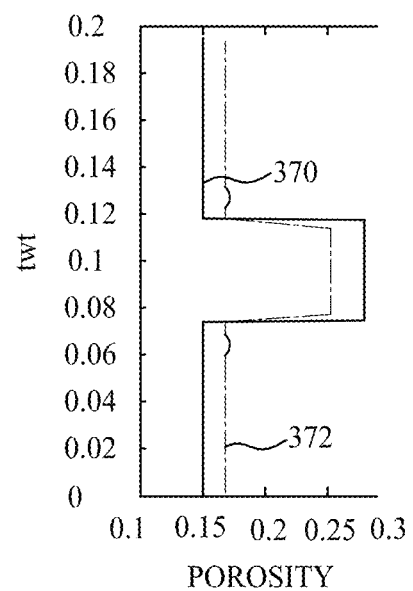
Figure 3F:
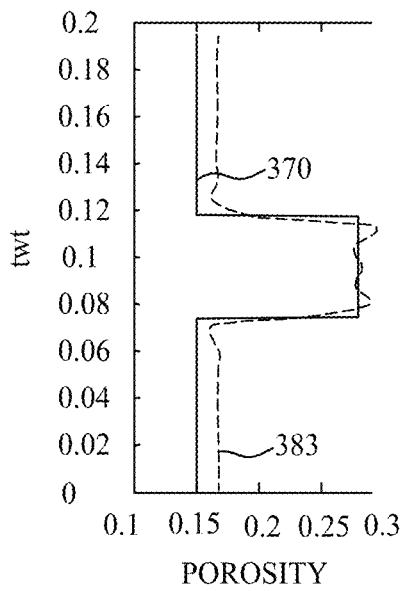

If the iteration cycle continues, the method 200 continues at block 250, wherein the petrophysical properties of the new model of block 230 are updated based on the learned information of block 201. The updated new model becomes the prior model for the next iteration. In some embodiments, the updated new model includes data at a higher sampling rate (e.g., the sampling rate of the resampled data of block 220), rather than at the original sampling rate SR of the obtained seismic data of block 203. FIG. 3C illustrates an updated prior model 372 which is based on new model 381 and learned information for the subsurface region. For example, the learned information may be probability distributions for different rock types and transitional probabilities. In FIG. 3C, the porosity of the prior model in the shale appears too large, while the sand appears to have a porosity that is too low. As illustrated, the porosity and $V_{clay}$ values of new model 381 of FIG. 3B are used to derive the prior model 372 of FIG. 3C. A general framework for updating petrophysical properties based on learned information can be found in US Patent Application No. 2018/0156932, which is incorporated herein by reference in all jurisdictions that allow it.

Figure 3H:
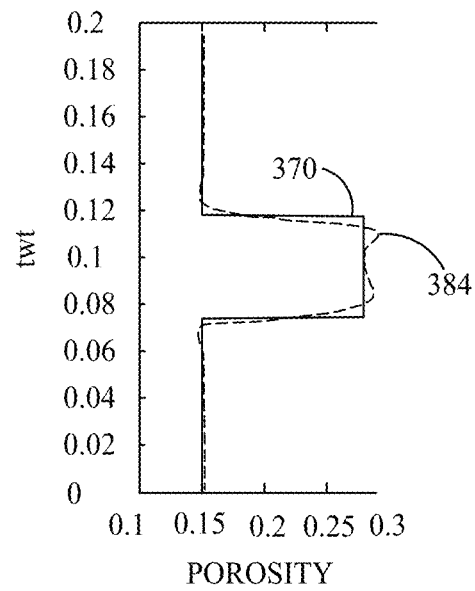
Figure 3E:
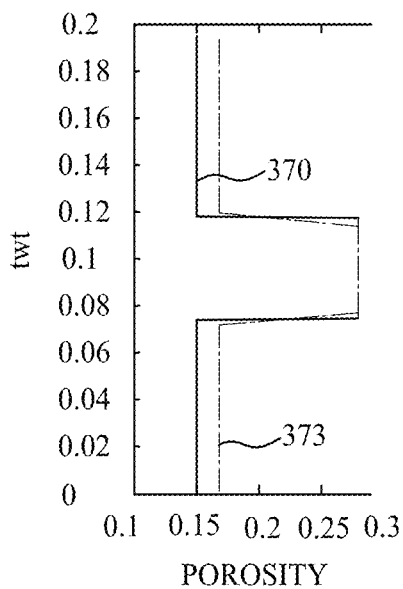

The method continues at block 210 as before. For example, FIG. 3D illustrates new model 382 resulting from an inversion using linear physics of the synthesized seismic data and the prior model 372. FIG. 3E illustrates an updated prior model 373 which is based on new model 382 and the learned information based on the two rock types present in the true model (Table 1) as well as two artificial lower quality sands. In the illustrated example of FIG. 3E, two porosity values (0.17 and 0.28) are determined for the shale and the sand, respectively.

Figure 3G:
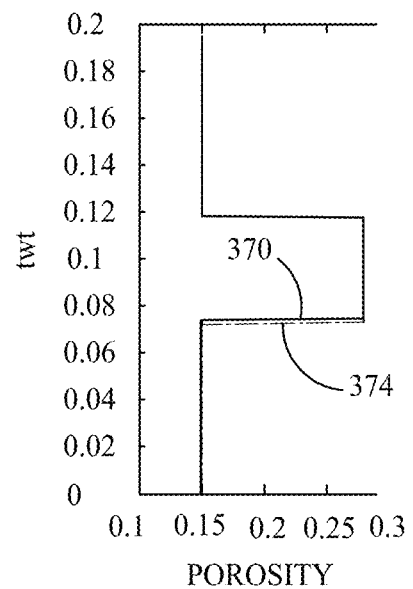

FIG. 3G shows the prior model 374, which was determined from the parameter estimate 383 using only two rock types (Table 1). The shale background appears to be predicted correctly, and the prior model appears almost identical to the true model. FIG. 3H shows the inversion result with the updated prior model 384, using the prior model 374 and non-linear physics.

Figure 3J:
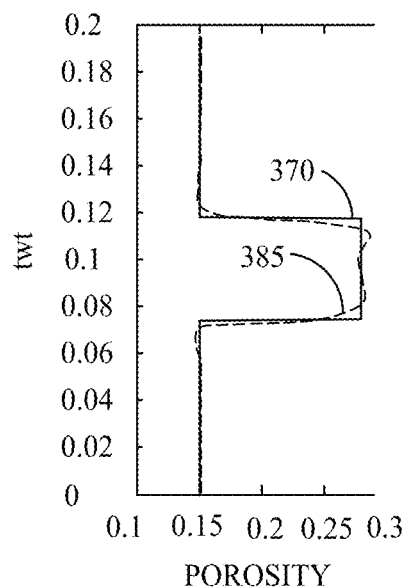
Figure 3I:
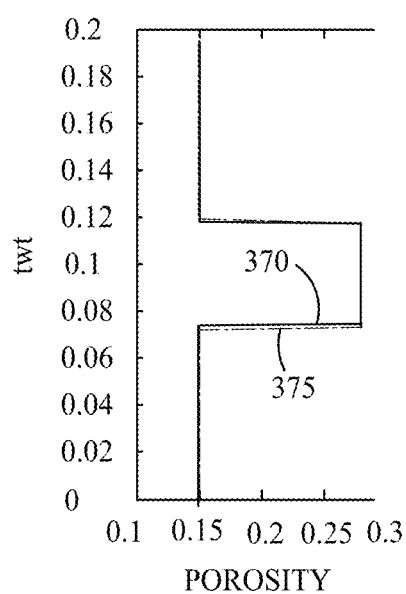

The method 200 concludes at block 260, wherein the output is a final model (or final updated model) of petrophysical properties at a sub-seismic resolution scale. For example, FIG. 3J illustrates a final model 385 which is very close to "true" porosity model 370. It should be appreciated that final model 385 is not as sharp as the prior model 375 (in FIG. 3I) at least in part because model smoothing was used for regularization. Other regularization terms could be used to better maintain the frequency in the prior model, e.g. any L1 based regularization or smoothing the difference between the prior model and the petrophysical property estimate from the optimization step.

In some embodiments, the prior model is learning the sub-seismic information from the petrophysical property estimates iteratively. In some embodiments, the inversion may be run using a finer sampling than typically used for seismic data to allow for inclusion of sub-seismic information as well as more accurate placement of boundaries. In some embodiments, the inversion results in estimates for porosity and $V_{clay}$. These estimates may then be used in a learning step to infer a new prior model, which is consistent with the porosity and $V_{clay}$ estimates. In some embodiments, the learning step may be done with any type of machine learning, ranging from a simple 1D Hidden Markov Model to some deep learning trained on 3D concept models. In some embodiments, the sampling rate at which the inversion is run (during the optimization step) and at which the prior model is inferred (during the learning step) is fine enough to allow learning sub-seismic information. During subsequent iterations, the inversion may be run using the learned prior model, which contains sub-seismic information.

In some embodiments only nonlinear physics is used instead of a two-step approach of (1) linear for the first n iterations followed by (2) nonlinear for all iterations subsequent to the first through nth iterations (i.e., (1) linear for the first one or more iterations, followed by (2) non-linear for all iterations subsequent to the first one or more iterations). In some embodiments only linear physics is used for all iterations without any subsequent inversion using nonlinear physics. In some embodiments nonlinear physics is used to predict the seismic amplitudes, and the rock physics model is linear. In some embodiments linear physics is used to predict the seismic amplitudes, and the rock physics model is nonlinear. In some embodiments, different combinations of geophysical data and/or geophysical properties are used.

In some embodiments, resampling may be applied as shown at block 220 and/or before or during the iterations of the inversion process of block 230. For example, instead of resampling the data before the inversion as illustrated in FIG. 2, the resampling might be done on-the fly. For example, in one or more iterations, the data to be inverted may be sampled at a first frequency (e.g. 4 ms) and may be resampled into memory at a second frequency (e.g., 2 ms) as the inversion is performed. As another example, separate data grids may be used for the inversion and the forward modeling. In this example, resampling may transform the data from a coarse modeling grid to a fine inversion grid. A more detailed description of the inversion and forward modeling on different grids is described in U.S. Pat. No. 8,923,094, which is incorporated herein by reference in all jurisdictions that allow it. In at least some portions of U.S. Pat. No. 8,923,094, the inversion happens at the seismic scale, and only the forward models for non-seismic data (e.g. electromagnetic data) are on a coarser grid. In some embodiments disclosed herein, the scaling between fine and coarse grids may apply to non-seismic data and seismic data, and the inversion grid may be defined at a finer sampling than the modeling grid. In some embodiments, the prior model may be defined at a grid finer than standard seismic sampling, thus allowing to resample with high frequency information during the inversion.

FIGS. 4A-4E show the first derivative of the inverted porosity for the synthetic wedge model corresponding to the iterations shown in FIGS. 3A, 3C, 3E, 3G, and 3I. As shown in FIG. 4A, the first iteration has a fairly smooth derivative at the edge of the wedge. Subsequent iterations, shown in FIGS. 4B-4E, each using an updated prior model, show much sharper derivatives. FIG. 4F shows the spectral content (e.g., first derivative) of the petrophysical property estimates shown in FIGS. 4A-4E. Since the porosity in FIG. 3A is a single value throughout the subsurface region, FIG. 4A contains no sub-seismic frequencies. The spectrum 410, corresponding to FIG. 4A, drops at around 50 Hz and does not extend to high frequencies (e.g., in this case, frequencies above about 77 Hz). That is, after the first optimization step in block 230, the solution basically contains frequencies in the seismic frequency band. After the first learning step in block 250, the solution sharpens and contains sub-seismic frequencies, as illustrated by spectra 420, 430, 440, 450 in FIG. 4F, corresponding to FIGS. 4B-4E, respectively. It can be seen that, once the prior model is learned, the boundary estimate gets sharper, and the solution extends into the sub-seismic frequency range.

In some embodiments, additional regularization may be utilized, especially for nonlinear problems. All examples shown here are run with simple, first derivative-based vertical smoothing of the petrophysical property estimate, as discussed earlier. However, other regularization might be more suitable.

For example, a regularization that is particularly well suited if using a prior model with sharp boundaries is to smooth the difference between the prior model and the petrophysical properties estimate from the current iteration. This type of regularization may better retain sharp boundaries in the prior model because the boundaries are not penalized.

As another example discussed earlier, any L1-norm based regularization may be utilized so as to better retain single outliers (e.g., a sharp jump in the petrophysical property estimate).

A prior model may help recover information missing or underrepresented in high frequency ranges (e.g., information about signals attenuated through mechanical loss and/or wavefield scattering). For example, the model structure at each iteration may be informed by a prior model. The initial or base values for the model parameters may utilize the same values as in the initial prior model. Moreover, the model structure may be configured to receive resampled data. At each iteration, the petrophysical properties may be updated based on both the resampled data and the prior model. The seismic inversion adds the sub-seismic information from the prior model into the new model. At each iteration, the weighting between the resampled seismic data and prior model may be adjusted so that the prior model is consistent with the data. Moreover, a combination of the finer sampling of the resampled seismic data and the learning step being able to infer sub-seismic prior models allows the optimization step to return petrophysical property estimates with frequency content beyond the seismic scale. The petrophysical property estimates in the seismic frequency band are driven by the seismic data, while the petrophysical property estimates at sub-seismic resolution scales may be driven by the learned information. The finer sampling may also allow more precise estimates of layer thickness as well as recovering thin sands.

In practical applications, the present technological advancement must be used in conjunction with a seismic data analysis system (e.g., a high-speed computer) programmed in accordance with the disclosures herein (including, e.g., for performing inversion, resampling, and/or generating any of the various models (e.g., models of the subsurface) as described herein). Such a seismic data analysis system may be referred to in generic shorthand simply as a "computer" or "computer system." The same or a different computer (and/or seismic data analysis system) may be used to carry out different inversions, and/or different steps of generating models, and/or other activities such as resampling. Thus, referring to any of these steps as carried out "using a computer" will be understood to mean that the same or different computers may be used for such steps, unless context clearly dictates otherwise.

Preferably, in order to efficiently perform FWI, the seismic data analysis system is a high performance computer ("HPC"), as known to those skilled in the art. Such high performance computers typically involve clusters of nodes, each node having multiple CPUs (which can be understood also to include processor functionality on hardware such as graphics processing units or GPUs), and computer memory that allow parallel computation. The models may be visualized and edited using any interactive visualization programs and associated hardware, such as monitors and projectors. The architecture of the system may vary and may be composed of any number of suitable hardware structures capable of executing logical operations and displaying the output according to the present technological advancement. Those of ordinary skill in the art are aware of suitable supercomputers available from Cray or IBM, as well as other architectures such as HPCs with multiple GPU clusters.

Figure 5:
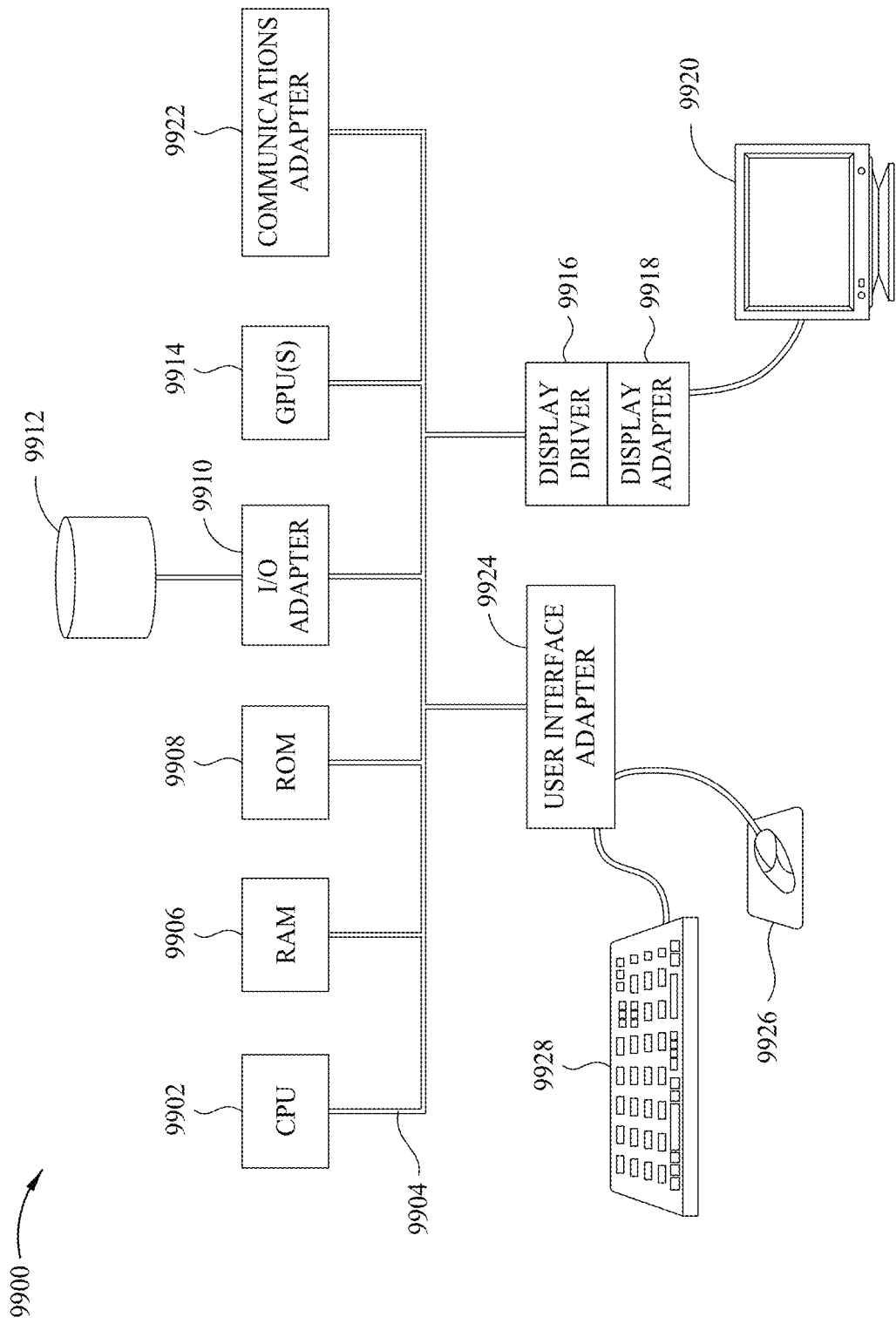
FIG. 5 illustrates a block diagram of a seismic data analysis system 9900 upon which the present technological advancement may be embodied.

FIG. 5 illustrates a block diagram of a seismic data analysis system 9900 upon which the present technological advancement may be embodied. A central processing unit (CPU) 9902 is coupled to system bus 9904. The CPU 9902 may be any general-purpose CPU, although other types of architectures of CPU 9902 (or other components of exemplary system 9900) may be used as long as CPU 9902 (and other components of system 9900) supports the operations as described herein. Those of ordinary skill in the art will appreciate that, while only a single CPU 9902 is shown in FIG. 5, additional CPUs may be present. Moreover, the system 9900 may comprise a networked, multi-processor computer system that may include a hybrid parallel CPU/GPU system. The CPU 9902 may execute the various logical instructions according to various teachings disclosed herein. For example, the CPU 9902 may execute machine-level instructions for performing processing according to the operational flow described.

The seismic data analysis system 9900 may also include computer components such as non-transitory, computer-readable media. Examples of computer-readable media include a random access memory ("RAM") 9906, which may be SRAM, DRAM, SDRAM, or the like. The system 9900 may also include additional non-transitory, computer-readable media such as a read-only memory ("ROM") 9908, which may be PROM, EPROM, EEPROM, or the like. RAM 9906 and ROM 9908 hold user and system data and programs, as is known in the art. The system 9900 may also include an input/output (I/O) adapter 9910, a communications adapter 9922, a user interface adapter 9924, and a display adapter 9918; it may potentially also include one or more graphics processor units (GPUs) 9914, and one or more display driver(s) 9916.

The I/O adapter 9910 may connect additional non-transitory, computer-readable media such as a storage device(s) 9912, including, for example, a hard drive, a compact disc ("CD") drive, a floppy disk drive, a tape drive, and the like to seismic data analysis system 9900. The storage device(s) may be used when RAM 9906 is insufficient for the memory requirements associated with storing data for operations of the present techniques. The data storage of the system 9900 may be used for storing information and/or other data used or generated as disclosed herein. For example, storage device(s) 9912 may be used to store configuration information or additional plug-ins in accordance with the present techniques. Further, user interface adapter 9924 couples user input devices, such as a keyboard 9928, a pointing device 9926 and/or output devices to the system 9900. The display adapter 9918 is driven by the CPU 9902 to control the display on a display device 9920 to, for example, present information to the user. For instance, the display device may be configured to display visual or graphical representations of any or all of the models discussed herein (e.g., prior models, new models, geologic models, rock physics models). As the models themselves are representations of geophysical data, such a display device may also be said more generically to be configured to display graphical representations of a geophysical data set, which geophysical data set may include the models (e.g., prior models, new models, updated prior models, final updated models, geologic models, rock physics models) described herein, as well as any other geophysical data set those skilled in the art will recognize and appreciate with the benefit of this disclosure.

The architecture of seismic data analysis system 9900 may be varied as desired. For example, any suitable processor-based device may be used, including without limitation personal computers, laptop computers, computer workstations, and multi-processor servers. Moreover, the present technological advancement may be implemented on application specific integrated circuits ("ASICs") or very large scale integrated ("VLSI") circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the system 9900 may include various plug-ins and library files. Input data may additionally include configuration information.

The above-described techniques, and/or systems implementing such techniques, can further include hydrocarbon management based at least in part upon the above techniques. For instance, methods according to various embodiments may include managing hydrocarbons based at least in part upon models constructed according to the above-described methods. In particular, such methods may include drilling a well, and/or causing a well to be drilled, based at least in part upon the models (e.g., such that the well is located based at least in part upon a location determined from the models, which location may optionally be informed by other inputs, data, and/or analyses, as well) and further prospecting for and/or producing hydrocarbons using the well.

The foregoing description is directed to particular example embodiments of the present technological advancement. It will be apparent, however, to one skilled in the art, that many modifications and variations to the embodiments described herein are possible. All such modifications and variations are intended to be within the scope of the present disclosure, as defined in the appended claims.

The invention claimed is:

1. A method for generating an image of a subsurface region, the method comprising:
    (a) obtaining a set of seismic data and/or data derived therefrom for the subsurface region;
    (b) resampling the set of seismic data and/or data derived therefrom to generate a resampled data set, wherein a sampling rate of the resampled data set is at least twice the sampling rate of the set of seismic data and/or data derived therefrom;
    (c) inverting the resampled data set with an initial prior model of the subsurface region to generate a new model of the subsurface region;
    (d) updating the new model based on learned information to generate an updated prior model of the subsurface region; and
    (e) iterating steps (c) and (d) until a pre-determined end point is reached, thereby obtaining a final updated model of the subsurface, by substituting the initial prior model in each iteration with the updated prior model from an immediately-preceding iteration.

2. The method of claim 1, wherein the inverting the resampled data set comprises a one-stage petrophysical inversion.

3. The method of claim 1, wherein the inverting the resampled data set comprises Full Wavefield Inversion.

4. The method of claim 1, wherein the end point is determined to be when the prior model of the $n^{th}$ iteration deviates less than 10% from the prior model of the n+1 iteration.

5. The method of claim 1, wherein the resampling consists of subsampling.

6. The method of claim 1, wherein the set of seismic data and/or data derived therefrom is selected from the group consisting of:
    seismic data for the subsurface region,
    seismic data and a velocity model for the subsurface region,
    seismic data and elastic parameters for the subsurface region,
    elastic parameters for the subsurface region, and
    any combination of two or more of the foregoing.

7. The method of claim 1, wherein one or more additional geophysical data types selected from resistivity data and electromagnetic data are obtained in addition to said set of seismic data and/or data derived therefrom; and further wherein the inverting in step (c) to further includes inverting the one or more additional geophysical data types.

8. The method of claim 1, wherein the set of seismic data and/or data derived therefrom comprises elastic parameters generated by Full Waveform Inversion of seismic data for the subsurface region.

9. The method of claim 1, further comprising, after the end point is reached, imaging a final model of the subsurface region based on an immediately-preceding new model.

10. The method of claim 1, further comprising:
    training a learned information subsystem with information about the subsurface region; and
    obtaining the learned information for updating the new model from the learned information subsystem.

11. The method of claim 10, wherein the learned information subsystem comprises at least one of a 1D Hidden Markov Model and a 3D concepts model.

12. The method of claim 10, wherein the learned information subsystem is trained using at least one of: well logs, synthetic traces, 3D concepts model, 3D physical simulations, 3D analogues, and any combination thereof.

13. The method of claim 1, wherein the inverting the resampled data set comprises an optimization step, and the updating the new model based on the learned information comprises a learning step.

14. The method of claim 1, wherein the updated prior model comprises high frequency information.

15. The method of claim 1, further comprising:
    applying a first weighting to the resampled data set and the initial prior model during the inverting of a first iteration; and
    applying a second weighting to the resampled data set and the initial prior model during the inverting of a second iteration, wherein the first weighting is different from the second weighting, and the second iteration is subsequent to the first iteration.

16. The method of claim 1, wherein the resampling is high fidelity.

17. The method of claim 1, wherein, for each iteration, the initial prior model comprises values for porosity and volume of clay throughout the subsurface region.

18. The method of claim 1, wherein the set of seismic data and/or data derived therefrom comprises data with frequency below 50 Hz, and the resampled data set comprises data with frequency above 50 Hz.

19. The method of claim 1, wherein:
for the first one or more iterations, the inverting the resampled data set is carried out using linear or log-linear physics, and for all iterations subsequent to said first one or more iterations, the inverting the resampled data set is carried out using nonlinear physics.

20. The method of claim 1, wherein the resampling, inverting, and updating are each carried out on one or more seismic data analysis systems.

21. The method of claim 1, further comprising managing hydrocarbons based at least in part upon the final updated model of the subsurface.

22. A method comprising:
(a) obtaining a set of seismic data and/or data derived therefrom for a subsurface region;
(b) resampling the set of seismic data and/or data derived therefrom to generate a resampled data set, wherein a sampling rate of the resampled data set is at least twice a sampling rate of the set of seismic data and/or data derived therefrom;
(c) utilizing linear inversion to invert the resampled data set with an initial prior model of the subsurface region to generate a new model of the subsurface region;
(d) updating the new model based on learned information to generate an updated prior model of the subsurface region;
(e) iterating steps (c) and (d) to generate a linear base model from the updated prior model from an immediately-preceding iteration;
(f) defining a second initial prior model to be the linear base model;
(g) utilizing nonlinear inversion to invert the resampled data set with the second initial prior model to generate a second new model of the subsurface region;
(h) updating the second new model based on learned information to generate a second updated prior model of the subsurface region; and
(i) iterating steps (g) and (h) until a pre-determined end point is reached, thereby obtaining a final updated model of the subsurface, by substituting the second initial prior model in each iteration with the second updated prior model from an immediately-preceding iteration;
wherein the resampling and steps (c), (d), (g), and (h) are carried out using one or more seismic data analysis systems.

23. A method for generating an image of a subsurface region, the method comprising:
(a) obtaining a seismic data set for the subsurface region;
(b) resampling the seismic data set to generate a resampled seismic data set, wherein a sampling rate of the resampled data set is at least twice a sampling rate of the set of seismic data;
(c) inverting the resampled seismic data set with an initial prior model of the subsurface region to generate a new model of the subsurface region; and
(d) imaging a final model of the subsurface region based on the new model;
wherein the resampling, inverting, and imaging are carried out using one or more seismic data analysis systems.

24. The method of claim 23, further comprising, using at least one of the one or more seismic data analysis systems:
(c2) updating the new model based on learned information to generate an updated prior model of the subsurface region; and
(c3) iterating steps (c) and (c2) until a pre-determined end point is reached, substituting the initial prior model in each iteration with the updated prior model from an immediately-preceding iteration.

* * * * *